US010462288B2

(12) United States Patent
Collart

(10) Patent No.: US 10,462,288 B2
(45) Date of Patent: *Oct. 29, 2019

(54) METHOD, DEVICE, AND SYSTEM OF PROVIDING CALLER IDENTIFICATION INFORMATION TO A USER OF A WIRELESS DEVICE

(71) Applicant: TracFone Wireless, Inc., Miami, FL (US)

(72) Inventor: Daniel Collart, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/253,787

(22) Filed: Jan. 22, 2019

(65) Prior Publication Data
US 2019/0158659 A1  May 23, 2019

Related U.S. Application Data

(63) Continuation of application No. 15/854,103, filed on Dec. 26, 2017, now Pat. No. 10,187,521, which is a continuation of application No. 14/640,821, filed on Mar. 6, 2015, now Pat. No. 9,860,371.

(60) Provisional application No. 61/948,966, filed on Mar. 6, 2014.

(51) Int. Cl.
*H04M 3/42* (2006.01)
*H04W 4/16* (2009.01)

(52) U.S. Cl.
CPC ......... *H04M 3/42042* (2013.01); *H04W 4/16* (2013.01); *H04M 2203/354* (2013.01); *H04M 2203/558* (2013.01)

(58) Field of Classification Search
None
See application file for complete search history.

(56) References Cited

U.S. PATENT DOCUMENTS

| 8,428,568 B1 * | 4/2013 | Kim .................. H04M 3/02 455/415 |
| 9,014,359 B1 | 4/2015 | Pfeffer et al. |
| 2003/0147518 A1 | 8/2003 | Albal et al. |

(Continued)

*Primary Examiner* — Idowu O Osifade
(74) *Attorney, Agent, or Firm* — BakerHostetler

(57) ABSTRACT

The invention is a method, system, and computer-readable medium for gathering and communicating caller identification information on a wireless device. The invention includes receiving, at a wireless device, a calling party phone number to be communicated by the wireless device, determining that the calling party phone number and a corresponding caller identification are not stored on the wireless device memory, performing, in response to the determination that the calling party phone number and the corresponding caller identification are not stored on the wireless device memory, an external database search for the calling party phone number and corresponding caller identification, and determining that the calling party phone number and corresponding caller identification have been identified in the external database search. The invention further includes communicating, in response to the determination that the calling party phone number and corresponding caller identification have been identified in the external database search, the calling party phone number and caller identification.

20 Claims, 5 Drawing Sheets

(56) References Cited

U.S. PATENT DOCUMENTS

2013/0083150 A1    4/2013  Howarter et al.
2015/0023485 A1*   1/2015  Guarriello ......... H04M 3/42161
                                                          379/88.23
2016/0156757 A1    6/2016  Kotab

* cited by examiner

METHOD, DEVICE, AND SYSTEM OF PROVIDING CALLER IDENTIFICATION INFORMATION TO A USER OF A WIRELESS DEVICE

CROSS REFERENCE TO PRIOR APPLICATIONS

This application is a continuation of U.S. patent application Ser. No. 15/854,103 filed Dec. 26, 2017, now U.S. Pat. No. 10,187,521, issued Jan. 22, 2019; which application is a continuation of U.S. patent application Ser. No. 14/640,821 filed Mar. 6, 2015, now U.S. Pat. No. 9,860,371, issued Jan. 2, 2018; and this application claims the benefit from U.S. Provisional Application No. 61/948,966 filed on Mar. 6, 2014, which are both hereby incorporated by reference for all purposes as if fully set forth herein.

TECHNICAL FIELD

The following disclosure generally relates to caller identification with respect to wireless devices. In particular, the disclosure focuses on gathering and communicating caller identification information to a wireless device user.

BACKGROUND

Wireless devices typically are able to send and receive information about the caller placing a phone call. Wireless devices can include, for example, cellular devices, tablets, smart phones, and the like. Stored in the memory, wireless devices often maintain a contact database. The contact database can include a telephone number correlated to a name, address, and company, for example. These contact databases can associate phone numbers with callers. When a recognized caller whose phone number is stored on the wireless device of a called party calls the called party, the called party's wireless device may communicate the caller's information on the called party's wireless device so that the called party can determine whether or not to answer the call. Sometimes, however, the phone number of the caller may not be associated with any contacts stored on the called party's wireless device, so a called party may not be able to determine who is calling. This results in some important calls not being answered or some unimportant calls being answered. On the other hand, answering such anonymous phone calls can result in being subject to undesirable solicitation phone calls and the like.

Therefore, there is a need for providing a calling party's information when that information is not stored on a called party's wireless device so that the called party's wireless device can communicate that information for the called party.

SUMMARY OF THE INVENTION

In one aspect, a method for communicating caller identification information includes receiving, at a wireless device, a calling party phone number to be communicated by the wireless device, determining that the calling party phone number and a corresponding caller identification are not stored on a wireless device memory, performing, in response to the determination that the calling party phone number and the corresponding caller identification are not stored on the wireless device memory, an external database search for the calling party phone number and corresponding caller identification, determining that the calling party phone number and corresponding caller identification have been identified in the external database search, and communicating, in response to the determination that the calling party phone number and corresponding caller identification have been identified in the external database search, the calling party phone number and caller identification.

In another aspect, a system includes at least one processor connected to at least one memory for communicating caller identification information, and further includes the at least one processor configured to receive, at a wireless device, a calling party phone number to be communicated by the wireless device, the at least one processor configured to determine that the calling party phone number and a corresponding caller identification are not stored on a wireless device memory, the at least one processor configured to perform, in response to the determination that the calling party phone number and the corresponding caller identification are not stored on the wireless device memory, an external database search for the calling party phone number and corresponding caller identification, the at least one processor configured to determine that the calling party phone number and corresponding caller identification have been identified in the external database search, and the at least one processor configured to communicate, in response to the determination that the calling party phone number and corresponding caller identification have been identified in the external database search, the calling party phone number and the caller identification.

In yet another aspect, a tangible non-transitory memory storing a computer program includes one or more code segments that, when executed, cause at least one processor to: receive, at a wireless device, a calling party phone number to be communicated by the wireless device, determine that the calling party phone number and a corresponding caller identification are not stored on a wireless device memory, perform, in response to the determination that the calling party phone number and the corresponding caller identification are not stored on the wireless device memory, an external database search for the calling party phone number and corresponding caller identification, determine that the calling party phone number and corresponding caller identification have been identified in the external database search, and communicate, in response to the determination that the calling party phone number and corresponding caller identification have been identified in the external database search, the calling party phone number and the caller identification.

Details of one or more implementations of the system, a device, and a method are provided for in the accompanying drawings and the description below. Other aspects of the gathering and communicating of caller identification information to a wireless device user will be apparent from the description and drawings, and from the claims.

DESCRIPTION OF DRAWINGS

Like reference symbols indicate like elements throughout the specification and drawings.

DETAILED DESCRIPTION

Figure 1:
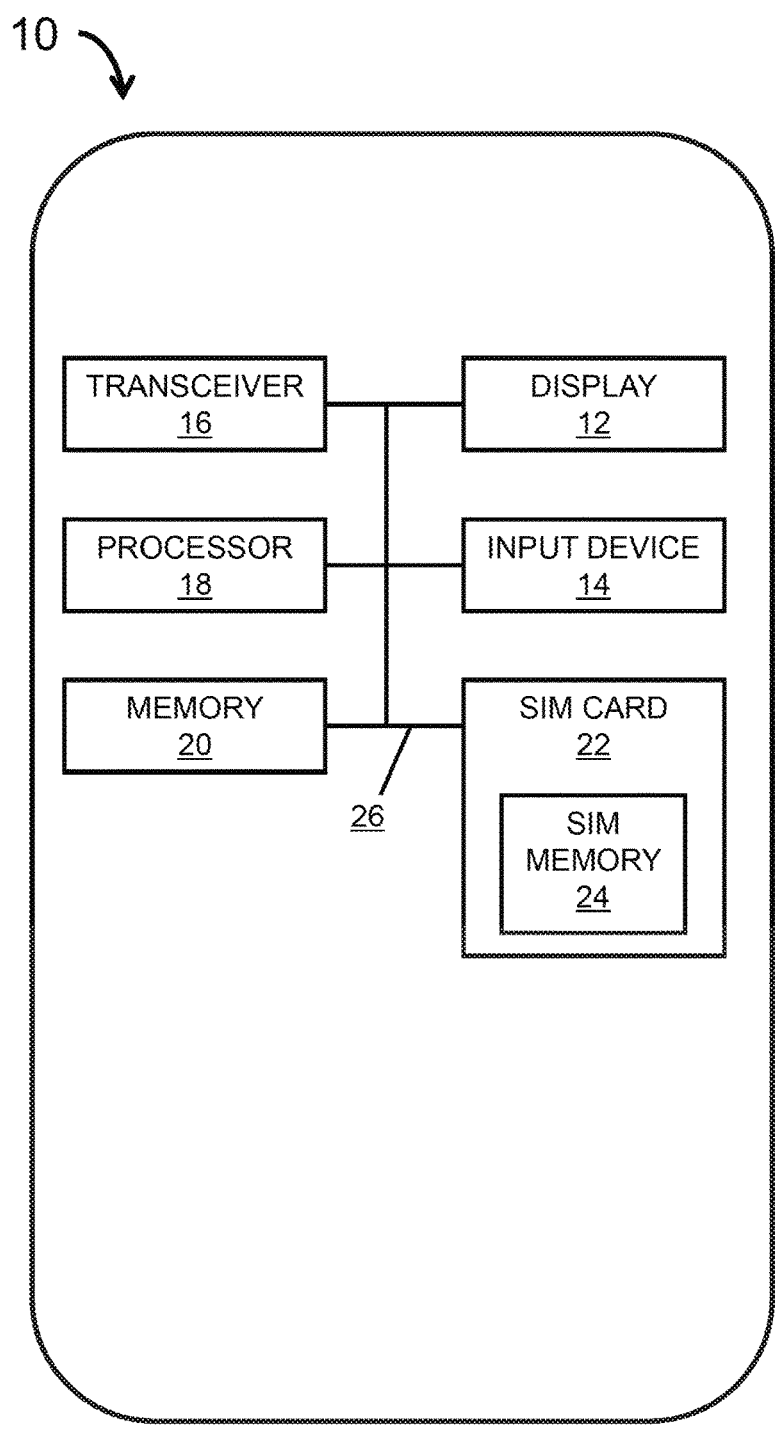
FIG. 1 illustrates a block diagram of an exemplary wireless device according to aspects of the disclosure.

FIG. 1 illustrates a block diagram of an exemplary wireless device according to aspects of the invention. In particular, FIG. 1 illustrates a block diagram of an exemplary wireless device 10. The wireless device 10 can be any mobile technology computing device that connects to a wireless communication network such as, for example, a mobile phone, a wireless handset, a wireless dongle, user equipment, a mobile station, or the like. The wireless device 10 includes a display 12, an input device 14, a transceiver 16, a processor 18, a memory 20, and may include a Universal Integrated Circuit Card ("UICC") or Subscriber Identification Module ("SIM") card 22. In some implementations, the SIM card 22 can be removably received within a card slot (not shown) in the wireless device 10 and can include internal SIM memory 24. The SIM card 22 can store information such as an International Mobile Subscriber Identity ("IMSI"), a key used to identify and authenticate subscribers using the wireless device 10, or the like. The SIM card 22 can be configured to be transferred between different wireless devices 10. In other aspects, the wireless device 10 operates without a UICC or SIM card 22.

The processor 18 is capable of processing instructions for execution within the wireless device 10. For example, the processor 18 can process instructions stored in the memory 20 to display graphical information on the display 12 and/or to transmit or receive data using the transceiver 16. The processor 18 can be a single-threaded processor or a multi-threaded processor. The memory 20 can include, for example, volatile or non-volatile random access memory ("RAM") and/or read only memory ("ROM"). Components 12, 14, 16, 18, and 20 within the wireless device 10 may communicate through an internal bus 26.

Figure 2:
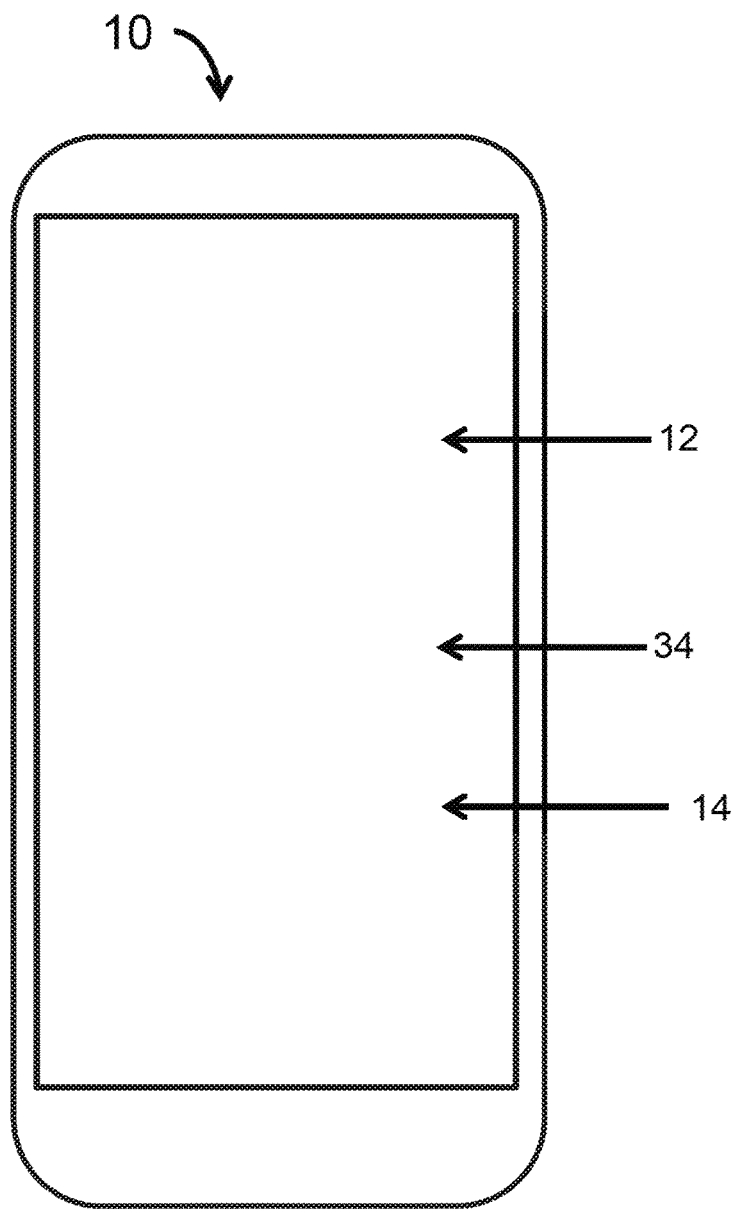
FIG. 2 illustrates an exemplary wireless device according to aspects of the disclosure.

FIG. 2 illustrates an exemplary wireless device according to aspects of the invention. In particular, the wireless device 10 may include a display 12 that is a screen that can be touch sensitive. An input device 14 can include one or more of a keypad (not shown), a trackball (not shown), selectable buttons (not shown), a touch screen 34 having selectable regions, or the like. Alternatively, the touch screen 34 may replace these components. The wireless device 10 may also include an antenna (not shown) coupled to the transceiver 16 to facilitate the transmission and receipt of communications by the wireless device 10.

Figure 3:
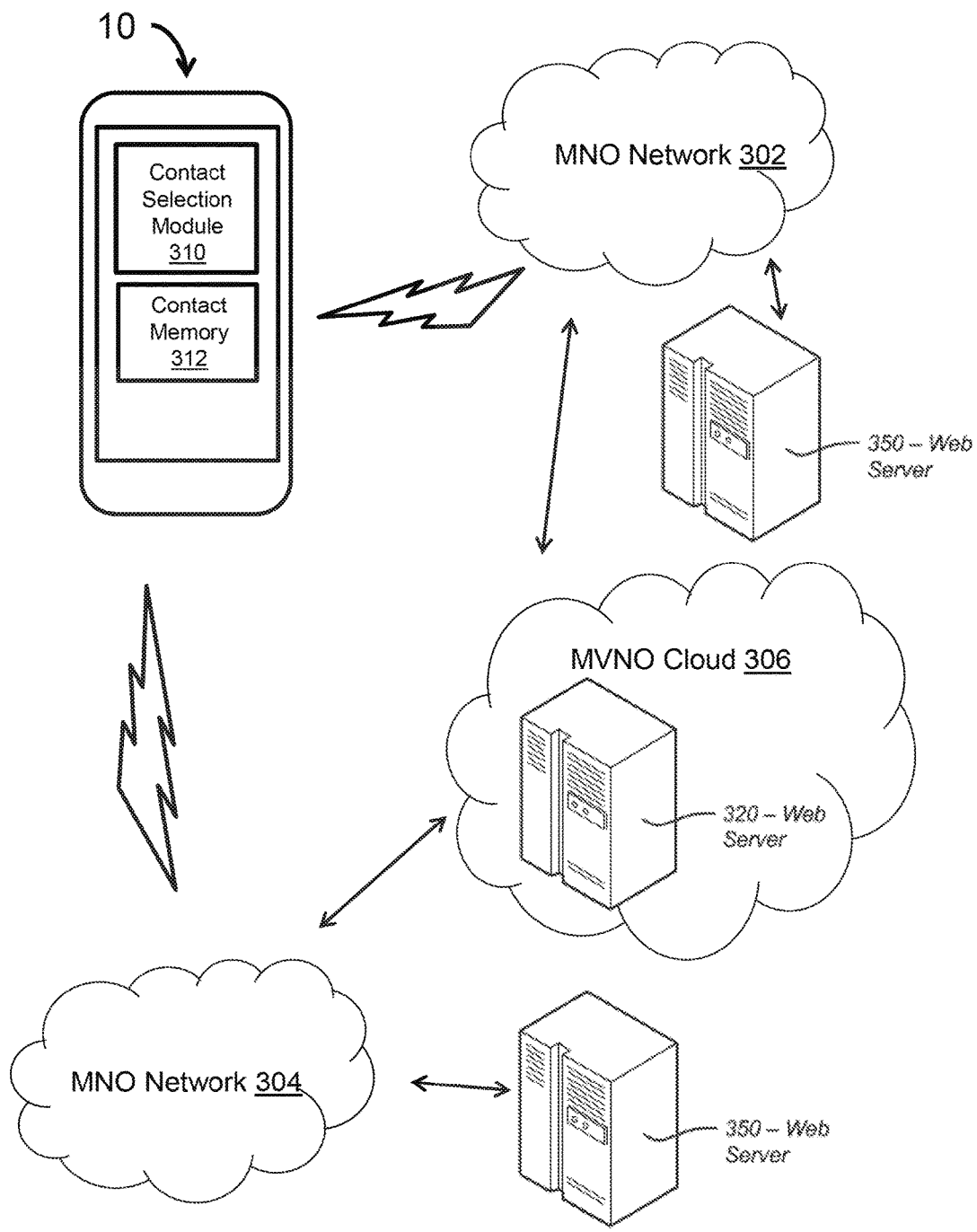
FIG. 3 illustrates a schematic diagram showing the connectivity between a wireless device, a plurality of mobile network operators, and a mobile virtual network operator according to aspects of the disclosure.

FIG. 3 illustrates a schematic diagram showing the connectivity between a wireless device, a plurality of mobile network operators, and a mobile virtual network operator according to aspects of the invention. In particular, FIG. 3 illustrates a schematic diagram showing the connectivity between a wireless device 10, a plurality of mobile network operators ("MNO") networks 302 and 304, and a mobile virtual network operator ("MVNO") cloud 306. The MVNO cloud 306 may be optional. Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network utilizing a communication channel, such as a cellular data network, e.g., a Global System for Mobile Communication ("GSM") network, a Code-Division Multiple Access ("CDMA") network, an Universal Mobile Telecommunications System ("UMTS") network, an Evolution-Data Optimized ("EV-DO") network, a Long-Term Evolution ("LTE") network, a wireless local network, a wide area network, and/or the like. The MNO networks 302 and 304 can connect the wireless device 10 to a web server 350 in order to search for the calling party's identification.

In some implementations, a wireless subscriber purchases a wireless communications plan from a MVNO. The MVNO is a wireless operator that typically does not own its own frequency spectrum or have its own network infrastructure. Instead, MVNOs contract for the right to access a wireless communications network owned by a MNO and sell that access to their wireless subscribers. Therefore, to provide activation, metering, additional services, and other customer services to their subscribers, MVNOs operate systems, such as the MVNO cloud 306, that communicate with the MNO networks 302 and 304.

The MVNO cloud 306 may communicate with the MNO networks 302 and 304 to receive information about and from the wireless device 10 on the MNO networks 302 and 304. The MVNO cloud 306 can be one or more of dedicated hardware, application specific integrated circuits, programmable logic arrays, computers, and servers including one or more processors and one or more memories. The MVNO cloud 306 can have a web server 320, to which the wireless device 10 may connect in order to search for a calling party's identification.

A contact selection module 310 may be included in the wireless device 10 and may be pre-installed or post-installed on the wireless device 10. The contact selection module 310 may be stored or executed on, for example, the memory 20, the UICC/SIM memory 24, dedicated hardware, application specific integrated circuits, programmable logic arrays, MNO networks 302 and 304, MVNO cloud 306, and/or the processor 18 of the wireless device 10. Contacts may be stored in the contact selection module 310 or outside of the contact selection module 310 in the memory 20, MNO networks 302 and 304, MVNO cloud 306, in an application stored in the memory 20, and/or the SIM memory 24 of the wireless device 10 in a contact memory 312.

The contact selection module 310 may be used to connect the wireless device 10 to a web server 320 included in the MVNO cloud 306, to a web server 350 that is accessible through the MNO Network 302 or 304, or the like. The contact selection module 310 searches stored contacts on the contact memory 312 to determine whether the calling party's phone number is stored on the contact memory 312. If the calling party's phone number is not stored on the wireless device 10, the wireless device 10 connects to a web server 320 or 350. The contact selection module may also perform an external database search on the web server 320 or 350 and on any other available databases to which the wireless device 10 may connect for the calling party's phone number.

Figure 4:
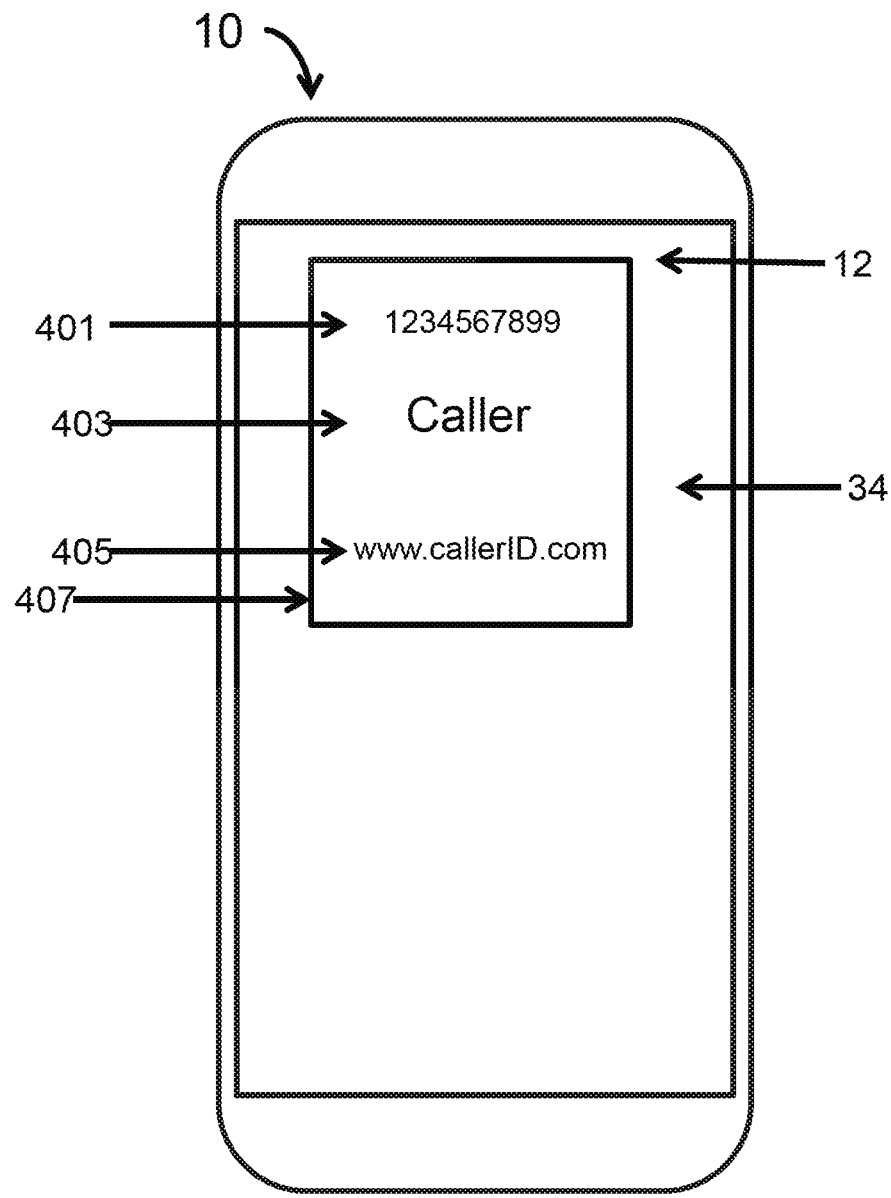
FIG. 4 illustrates the exemplary wireless device of FIG. 2 with a display showing caller identification information according to aspects of the present disclosure.

FIG. 4 illustrates the exemplary wireless device of FIG. 2 with a display showing caller identification information according to aspects of the present disclosure. In particular, FIG. 4 illustrates a typical wireless device 10 with caller identification display 407. The caller identification display 407 shows on the display 12 the calling party phone number 401 and the caller identification 403, and may display a web page identifier 405, if applicable, where the calling party's identification was found if the identification was found in an internet search. The web page identifier 405, if applicable, is displayed on the touch screen 34 so that the called party may touch the web page identifier 405 to activate a hyperlink that takes the user to the web page where the caller identification 403 was found by the contact selection module 310.

In some implementations, the contact selection module 310 external database search for the calling party phone number 401 may use a prioritization of web pages, other databases containing listings of phone numbers, or the like. Such databases include yellow pages, white pages, telemarketer listings, intranet databases to which the wireless device 10 user has access, workplace contact lists, Bluetooth databases, WIFI databases, and external contact lists to which the wireless device 10 user may subscribe, such as social media contact databases. The contact selection module 310 selects the associated caller identification 403 for the calling party from a database based on the priority of databases programmed into the module 310 or set by an application stored on the wireless device memory 20. The external database search conducted by the contact selection module 310 searches databases based on database priority, and when the contact selection module 310 finds the caller identification 403 based on the calling party phone number 401, the contact selection module 310 may store that information in the contact memory 312.

In other implementations, the contact selection module 310 finds in multiple databases the caller identification 403 associated with the calling party phone number 401. In such cases, the contact selection module 310 may store the caller identification 403 with the calling party phone number 401 in the contact memory 312 based on a priority of databases, meaning the caller identification 403 from the highest priority database is the information stored with the calling party phone number 401 in the contact memory 312.

In other implementations, the contact selection module 310 finds the first database listing the caller identification 403 associated with the calling party phone number 401 and may store the caller identification 403 with the calling party phone number 401 in the contact memory 312.

In other implementations, when the caller identification 403 is found on a web page, the contact selection module 310 may store a web page identifier 405 where the caller identification 403 was found in the contact memory 312 as a hyperlink. The web page identifier 405 may be the web page address for a website where the caller identification 403 was found.

In some situations, the caller identification 403 will be unknown and unidentified. In such situations, a message replaces the display of the caller identification 403 to notify the called party that the calling party's identification is unavailable. In such cases, the web page identifier 405 may not be displayed because there will be no web page to identify the calling party associated with the calling party phone number 401. In some situations, the message may be displayed as text on the display 12. In other situations, the message is a sound played by the wireless device 10. In further situations, the wireless device 10 may output an audio reading of the message.

Figure 5:
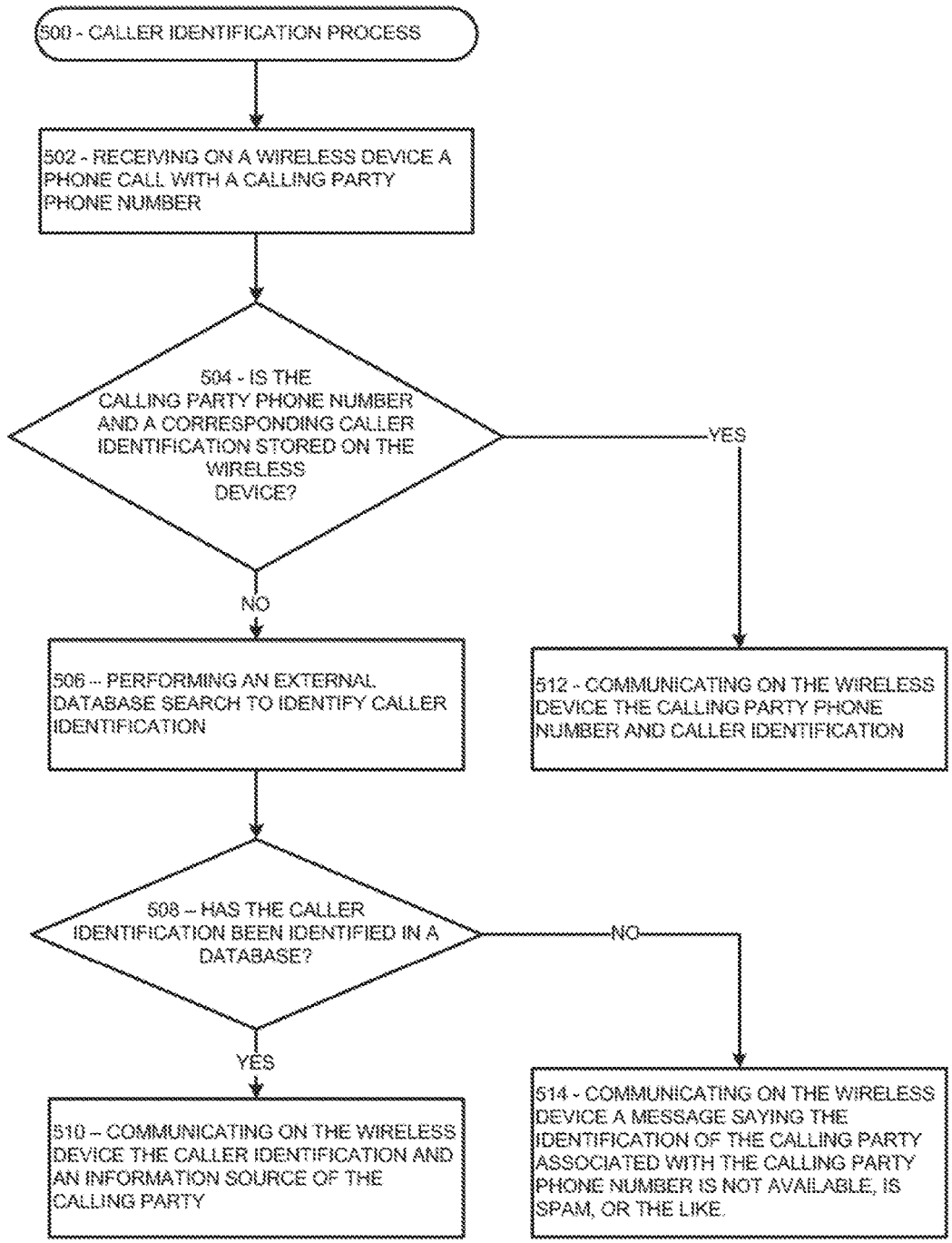
FIG. 5 illustrates a flowchart showing an exemplary process for finding and communicating caller identification information on a wireless device according to aspects of the disclosure.

FIG. 5 illustrates a flowchart showing an exemplary process for finding and communicating caller identification information on a wireless device according to aspects of the invention. One or more steps of the process 500 can be carried out by, for example, an electronic system such as the wireless device 10, MNO Networks 302 and 304, and/or the MVNO cloud 306.

In some implementations, contacts are stored in the contact memory 312 in the contact selection module 310. In other implementations, contacts are stored outside of the contact selection module 310 in the memory 20, in an application stored in the memory 20, in MNO networks 302 and 304, in an MVNO cloud 306, and/or the SIM memory 24 of the wireless device 10.

When the called party's wireless device 10 receives a phone call 502 from a calling party, the called party's wireless device 10 receives the phone number associated with the wireless device 10 of the calling party.

After receiving the calling party phone number 401, the called party's wireless device 10 determines whether the calling party phone number 401 is stored on the called party's wireless device 10. To evaluate whether the calling party's phone number is stored on the called party's wireless device 10, the called party's wireless device 10 may in some implementations search for a match of the calling party phone number 401 in the contact memory 312.

In other implementations, the called party's wireless device 10 may determine whether the calling party phone number 401 is stored on the called party's wireless device 10 by searching for a match of the calling party phone number 401 in the wireless device memory 20. In other implementations, the called party's wireless device may search for a match of the calling party phone number 401 in an application stored on the wireless device memory 20. In other implementations, the called party's wireless device may search for a match of the calling party phone number 401 on a SIM card 22. Determining whether the calling party phone number 401 is stored on the called party's wireless device 10 may occur without human interaction or augmentation.

If the called party's wireless device 10 determines that the called party phone number 401 is not stored on the called party's wireless device 10, the called party's wireless device 10 automatically connects to an external database to search 506 for the calling party phone number 401. The connecting to an external database to search for the calling party phone number 401 may occur without human interaction or augmentation.

In some implementations, the performing of an external database search for the calling party phone number 401 may be executed by connecting to a search engine like Google.com and entering the calling party phone number 401. In other implementations, the performing of an external database search for the calling party phone number 401 may be executed by connecting to an intranet database such as a workplace contact list stored on an intranet and searching for the calling party phone number 401. In other implementations, the performing of an external database search for the calling party phone number 401 may be executed by connecting to a social media account to which the wireless device 10 user is affiliated to search for the calling party phone number 401.

In some implementations, the wireless device may conduct a database search on the MNO network 302 and 304 and/or on the MVNO cloud 306. In such implementations, the contact memory 312 and the contact selection module 310 may be found on the MNO network 302 and 304 and/or on the MVNO cloud 306, and the database search may be conducted prior to the wireless device 10 notifying the called party of a phone call.

In some implementations, the performing of an external database search for the calling party phone number 401 may be executed by finding the first database to list the calling party phone number 401 and a party associated with the calling party phone number 401, storing the associated party in the contact memory 312 as the caller identification 403 with the associated phone number of the calling party, and storing in the contact memory 312 the associated web page identifier 405 of the website where the caller identification 403 was located if the calling party phone number 401 was found on an internet web page.

In other implementations, the performing of an external database search for the calling party phone number 401 may be executed by searching databases based on a database priority, and when the caller identification 403 is found based on an external database search of the calling party phone number 401, the wireless device 10 stores the caller identification 403 and web page identifier 405, if applicable, in the contact memory 312.

In other implementations, the performing of an external database search for the calling party phone number 401 may be executed by searching external databases for a set amount of time, finding as many identified parties listed and database sources for the calling party phone number 401 as the contact selection module 310 can find, and selecting based on a prioritized list of sources which caller identification 403 and web page identifier 405, if applicable, to store in the contact memory 312 for the corresponding calling party phone number 401.

After searching for the caller identification 403 associated with the calling party phone number 401, the called party's wireless device 10 determines whether the calling party phone number 401 has been identified on an external database 508. The determination is based on whether the caller identification 403 for the calling party phone number 401 has been found and stored in the contact memory 312. If the calling party phone number 401 has been found, then the web page identifier 405, if applicable, may also be stored in the contact memory 312 with the corresponding calling party phone number 401.

In some implementations, if no caller identification 403 has been stored in the contact memory 312 for the calling party phone number 401 within a set period of time, then the caller identification process 500 is terminated. Likewise, if the caller identification 403 has been stored in the contact memory 312 for the calling party phone number 401 within a set period of time, then the caller identification 403 has been found.

In other implementations, if no caller identification 403 has been stored in the contact memory 312 for the calling party phone number 401 after the called party's wireless device 10 searches all sources in its priority list, the caller identification 403 has not been found. Likewise, if the caller identification 403 has been stored in the contact memory 312 for the calling party phone number 401 after searching all of the sources in the called party's wireless device 10 priority list, then the caller identification 403 has been found. In other implementations, if the caller identification 403 has been stored in the contact memory 312 for the calling party phone number 401 at any time during a search based on prioritized sources, the caller identification 403 has been found.

In other implementations, determining whether the caller identification 403 has been found on an external database means searching to determine if the calling party phone number 401 is found on a telemarketing phone number listing website that is listed on a pre-set list of such websites stored on the wireless device 10, MNO network 302 and 304, MVNO cloud 306, or the like.

If the caller identification 403 for the calling party phone number 401 has been stored in the contact memory 312, the wireless device 10 communicates 510 the calling party phone number 401, the caller identification 403, and/or the web page identifier 405, if applicable. In some implementations, the communication 510 is text on the display 12 that shows each of the available pieces of information for the caller. In other implementations, the communication 510 is a sound played by the wireless device 10 to signal to the user that a number has been identified and stored in the contact memory 312. In addition, the wireless device 10 may provide an audio reading of the above-noted messages and information.

In the case that a calling party phone number 401 and corresponding caller identification 403 are found in the contact memory 312 upon the initial determination 504 of whether the calling party phone number 401 and corresponding caller identification 403 are stored in the contact memory 312 before an external database search, the called party's wireless device 10 may communicate 512 the calling party phone number 401 and the corresponding calling party identification 403.

In the case that the caller identification 403 for the calling party phone number 401 has not been found in the contact memory 312 or in an external database search, the called party's wireless device 10 communicates a message that the caller identification 403 is unavailable 514. In some implementations, communicating a message on the wireless device 10 that the caller identification 403 is unavailable means displaying text on the display 12 such as "Caller ID Unavailable," "Caller ID Not Found," "Unidentified Caller," or the like. In other implementations, communicating a message on the wireless device 10 that the caller identification 403 is unavailable means playing a sound on the wireless device 10. In addition, the wireless device 10 may provide audio reading of the above-noted messages.

In the case that the calling party phone number 401 has been found on a telemarketing phone number listing website but the caller identification 403 has not been found, the wireless device communicates a message that the caller identification 403 is associated with a telemarketer 514. In some implementations, communicating a message that the caller identification 403 is associated with a telemarketer means displaying text on the display 12 such as "Telemarketer," "Spam," or the like. In other implementations, communicating a message that the caller identification 403 is associated with a telemarketer means playing a sound on the wireless device 10. In further implementations, communicating a message that the caller identification 403 is associated with a telemarketer means providing an audio reading of a message notifying the wireless device 10 user that the caller identification 403 is associated with a telemarketer.

In some implementations, communicating 510 on the wireless device 10 the caller identification 403 and calling party phone number 401 includes an option to add the calling party phone number 401 to a "do not answer list" stored on the wireless device 10, on an MNO network 302 and 304, and/or on an MVNO cloud 306. In other implementations, communicating on the wireless device 10 a message that the caller identification is a telemarketer or spam 514 includes an option to add the calling party phone number 401 to a "do not answer list" stored on the wireless device 10 on an MNO network 302 and 304, and/or on an MVNO cloud 306.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, an Evolution-Data Optimized ("EV-DO") network, a Long-Term Evolution ("LTE") network and/or the like, and/or a combination of two or more thereof.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via communication channels.

In an embodiment, the invention may be web-based. For example, a server may operate a web application to allow the invention to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™' Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various embodiments of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the invention as described herein are optionally stored on a tangible non-transitory storage medium, such as: a magnetic medium such as a disk or tape, a magneto-optical or optical medium such as a disk, or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for displaying caller identification information within a wireless device, the method comprising:
    receiving, at a wireless device, a calling party phone number to be displayed by the wireless device;
    searching a wireless device memory in the wireless device for the calling party phone number and a corresponding caller identification;
    determining with the wireless device that the calling party phone number and a corresponding caller identification are not stored in the wireless device memory;
    performing with the wireless device, in response to the determination that the calling party phone number and the corresponding caller identification are not stored in the wireless device memory, an external database search by connecting the wireless device to the Internet to search for the calling party phone number and the corresponding caller identification;
    determining with the wireless device whether the calling party phone number and the corresponding caller identification have been identified in the external database search;
    displaying on the wireless device, when the determination that the calling party phone number and the corresponding caller identification have been identified in the external database search, the calling party phone number and caller identification;
    displaying on the wireless device, when the determination that the calling party phone number and the corresponding caller identification have not been identified in the external database search, an indication that the calling party phone number and caller identification is unavailable;
    determining that the calling party phone number and the corresponding caller identification have been identified in the external database search further comprises:
    displaying a web page that includes web page information on a display of the wireless device where the caller identification is found; and
    providing an option to a user to add the calling party phone number identified in the external database search to a "do not answer list" stored in the wireless device, wherein the searching the wireless device memory with the wireless device for the calling party phone number and a corresponding caller identification, the determining with the wireless device that the calling party phone number and a corresponding caller identification are not stored in the wireless device memory, the performing an external database search, the determining whether the corresponding caller identification have been identified in the external database search, and the displaying on the wireless device the calling party phone number and caller identification are performed by a processor of the wireless device.

2. The method of claim 1, further comprising playing audio that reads aloud a text of the caller identification on an audio output device of the wireless device in response to the determination that the calling party phone number and the corresponding caller identification have been identified in the external database search,
wherein the external database comprises at least one of the following: internet web pages, intranet databases, and mobile network databases.

3. The method of claim 1, further comprising playing a sound on the wireless device in response to the determination that the calling party phone number and the corresponding caller identification have been identified in the external database search.

4. The method of claim 1, further comprising playing audio that reads aloud a text of the caller identification on an audio output device of the wireless device in response to the determination that the calling party phone number and the corresponding caller identification have been identified in the external database search.

5. The method of claim 1, wherein the performing the external database search comprises searching a plurality of databases based on a database priority.

6. The method of claim 1, further comprising storing in the wireless device memory the calling party phone number, the web page information, and the corresponding caller identification identified in the external database search.

7. The method of claim 1, wherein the performing an external database search is performed for a predetermined time period, and after the predetermined time period has expired, the performing an external database search is terminated.

8. The method of claim 1,
wherein the performing the external database search comprises searching a plurality of databases based on a database priority;
wherein the performing an external database search is performed for a predetermined time period, and after the predetermined time period has expired, the performing an external database search is terminated; and
the method further comprising playing a sound on the wireless device in response to the determination that the calling party phone number and the corresponding caller identification have not been identified in the external database search.

9. A wireless device configured for providing caller identification information, comprising:
at least one processor configured to receive, at the wireless device, a calling party phone number to be displayed by the wireless device;
the at least one processor configured to search for the calling party phone number and a corresponding caller identification in a wireless device memory;
the at least one processor configured to determine that the calling party phone number and a corresponding caller identification are not stored in the wireless device memory;
the at least one processor configured to perform, in response to the determination that the calling party phone number and the corresponding caller identification are not stored on the wireless device memory, an external database search by connecting the wireless device to the Internet to search for the calling party phone number and the corresponding caller identification;
the at least one processor configured to determine whether the calling party phone number and the corresponding caller identification have been identified in the external database search;
the at least one processor configured to display, in response to the determination that the calling party phone number and the corresponding caller identification have been identified in the external database search, the calling party phone number and the caller identification;
the at least one processor configured to display, in response to the determination that the calling party phone number and the corresponding caller identification have not been identified in the external database search, an indication that the calling party phone number and the caller identification is unavailable;
the at least one processor is further configured to determine that the calling party phone number and the corresponding caller identification have been identified in the external database search;
the at least one processor is further configured to display a web page that includes web page information on a display of the wireless device that loads a web page where the caller identification is found; and
the at least one processor is further configured to provide an option to a user to add the calling party phone number identified in the external database search to a "do not answer list" stored in the wireless device,
wherein the at least one processor is configured to implement the search for the calling party phone number and a corresponding caller identification in the wireless device memory, the determination that the calling party phone number and the corresponding caller identification are not stored in the wireless device memory, the external database search for the calling party phone number and the corresponding caller identification, the determination that the calling party phone number and the corresponding caller identification have been identified in the external database search, and the display of the calling party phone number and the caller identification.

10. The wireless device of claim 9, wherein the at least one processor is further configured to play audio that reads aloud a text of the caller identification by the wireless device in response to the determination that the calling party phone number and the corresponding caller identification have been identified in the external database search,
wherein the external database comprises at least one of the following: internet web pages, intranet databases, and mobile network databases.

11. The wireless device of claim 9, wherein the at least one processor is further configured to perform the external database search based on a database priority.

12. The wireless device of claim 9, wherein the at least one processor is further configured to store in the wireless device memory the calling party phone number, the web page information, and the corresponding caller identification identified in the external database search.

13. The wireless device of claim 9, wherein the at least one processor is further configured such that the external database search for the calling party phone number and the corresponding caller identification is performed for a predetermined time period, and after the predetermined time period has expired, the performing an external database search is terminated.

14. The wireless device of claim 9,
wherein the at least one processor is further configured to perform the external database search based on a database priority;
wherein the at least one processor is further configured such that the external database search for the calling party phone number and the corresponding caller identification is performed for a predetermined time period, and after the predetermined time period has expired, the performing an external database search is terminated; and
the at least one processor further configured to play a sound on the wireless device in response to the determination that the calling party phone number and the corresponding caller identification have not been identified in the external database search.

15. A tangible non-transitory memory storing a computer program, the computer program comprising one or more code segments that, when executed by a wireless device, cause at least one processor of the wireless device to:
receive, at a wireless device, a calling party phone number to be displayed by the wireless device;
search for the calling party phone number and a corresponding caller identification in a wireless device memory;
determine that the calling party phone number and a corresponding caller identification are not stored in a wireless device memory;
perform, in response to the determination that the calling party phone number and the corresponding caller identification are not stored on the wireless device memory, an external database search by connecting the wireless device to the Internet to search for the calling party phone number and the corresponding caller identification;
determine whether the calling party phone number and the corresponding caller identification have been identified in the external database search;
display, in response to the determination that the calling party phone number and the corresponding caller identification have been identified in the external database search, the calling party phone number and the caller identification;
display, in response to the determination that the calling party phone number and the corresponding caller identification have not been identified in the external database search, an indication that the calling party phone number and the caller identification is unavailable; and
determine that the calling party phone number and the corresponding caller identification have been identified in the external database search further comprises:
displaying a web page that includes web page information on a display of the wireless device where the caller identification is found;
storing in the wireless device memory the calling party phone number, the web page information, and the corresponding caller identification identified in the external database search; and
providing an option to a user to add the calling party phone number identified in the external database search to a "do not answer list" stored in the wireless device,
wherein the search for the calling party phone number and a corresponding caller identification in the wireless device memory, the determination that the calling party phone number and a corresponding caller identification are not stored in a wireless device memory, the external database search of the Internet to search for the calling party phone number and the corresponding caller identification, the determination that the calling party phone number and the corresponding caller identification have been identified in the external database search, and the display of the calling party phone number and the caller identification are performed by the at least one processor of the wireless device.

16. The memory of claim 15, further comprising play a sound on the wireless device in response to the determination that the calling party phone number and the corresponding caller identification have been identified in the external database search,
wherein the external database comprises at least one of the following: internet web pages, intranet databases, and mobile network databases.

17. The memory of claim 15, further comprising playing audio that reads aloud a text of the caller identification on an audio output device of the wireless device in response to the determination that the calling party phone number and the corresponding caller identification have been identified in the external database search.

18. The memory of claim 15, wherein the perform the external database search comprises searching a plurality of databases based on a database priority.

19. The memory of claim 15, wherein the perform the external database search of the Internet to search for the calling party phone number and the corresponding caller identification is performed for a predetermined time period, and after the predetermined time period has expired, the performing an external database search is terminated.

20. The memory of claim 15,
wherein the perform the external database search comprises searching a plurality of databases based on a database priority;
wherein the perform the external database search of the Internet to search for the calling party phone number and the corresponding caller identification is performed for a predetermined time period, and after the predetermined time period has expired, the performing an external database search is terminated; and
further comprising playing a sound on the wireless device in response to the determination that the calling party phone number and the corresponding caller identification have not been identified in the external database search.

* * * * *